United States Patent
Toyoda et al.

(10) Patent No.: US 6,781,721 B2
(45) Date of Patent: Aug. 24, 2004

(54) COMMUNICATION APPARATUS WITH RELAY FUNCTION AND RELAY METHOD

(75) Inventors: Kiyoshi Toyoda, Kunitachi (JP); Kumi Okada, Yokohama (JP)

(73) Assignee: Panasonic Communications Co., Ltd., Fukuoka (JP)

( * ) Notice: Subject to any disclaimer, the term of this patent is extended or adjusted under 35 U.S.C. 154(b) by 413 days.

(21) Appl. No.: 09/945,667

(22) Filed: Sep. 5, 2001

(65) Prior Publication Data

US 2002/0027677 A1 Mar. 7, 2002

Related U.S. Application Data

(63) Continuation of application No. 09/088,712, filed on Jun. 2, 1998, now Pat. No. 6,330,070.

(30) Foreign Application Priority Data

Jun. 5, 1997 (JP) .......................................... JP9-163277

(51) Int. Cl.[7] ................................................ H04N 1/00
(52) U.S. Cl. ..................... 358/402; 358/1.15; 358/407; 379/100.09; 379/100.08
(58) Field of Search ................................ 358/402, 403, 358/436, 434, 468, 442, 407, 1.15; 379/93.23, 93.24, 100.09, 100.08, 100.06, 100.15, 100.17

(56) References Cited

U.S. PATENT DOCUMENTS

| | | | |
|---|---|---|---|
| 4,814,890 A | * 3/1989 | Kato | 358/443 |
| 4,896,319 A | * 1/1990 | Lidinsky et al. | 370/427 |
| 4,941,170 A | * 7/1990 | Herbst | 379/100.07 |
| 5,072,401 A | * 12/1991 | Sansone et al. | 700/219 |
| 5,339,156 A | * 8/1994 | Ishii | 358/402 |

(List continued on next page.)

FOREIGN PATENT DOCUMENTS

| | | | |
|---|---|---|---|
| EP | 0-770968 | | 5/1997 |
| JP | 3-222551 | * | 10/1991 |
| JP | 5-103127 | * | 4/1993 |
| JP | 5-304538 | * | 11/1993 |
| JP | 6-217069 | * | 8/1994 |
| JP | 6-319006 | * | 11/1994 |
| JP | 8-314829 | * | 11/1996 |
| JP | 0-770968 | * | 5/1997 |
| JP | 9-116728 | * | 5/1997 |

OTHER PUBLICATIONS

An Article entitled "The Multimedi Fax–MIME Gateway", Patel et al., IEEE Journal, Winter 1994, pp. 64–70.*
English Language Abstarct of HEI 9–116728.*
Douglas E. Comer, "Internetworking with TCP/IP vol. 1,: Principles, Protocols, and Architecture", Third Edition, 1995.*
English Language Abstract of HEI 8–314829.*
English Langiuage Abstract of HEI 3–222551.*

(List continued on next page.)

*Primary Examiner*—Kimberly Williams
*Assistant Examiner*—Tia Carter
(74) *Attorney, Agent, or Firm*—Greenblum & Bernstein, P.L.C.

(57) ABSTRACT

A facsimile apparatus is connected to a telephone network and to an internet network. The facsimile apparatus is capable of receiving E-mail data via the internet network and transmitting facsimile data to a facsimile destination via the telephone network. A detector detects a password indicating an instruction to relay the received E-mail data to the facsimile destination, and a telephone number of the facsimile destination, in a mail address of the E-mail data. A generator, when the detector detects the password and the telephone number, deletes the password from the mail address, and generates header information including a mail address after deleting the password. A converter converts the E-mail data, including the header information, into facsimile data. A transmitter transmits the converted facsimile data with the header information, but without the password to the facsimile destination indicated by the telephone number.

15 Claims, 5 Drawing Sheets

U.S. PATENT DOCUMENTS

| | | | | | |
|---|---|---|---|---|---|
| 5,499,108 | A | * | 3/1996 | Cotte et al. | 358/400 |
| 5,767,985 | A | * | 6/1998 | Yamamoto et al. | 358/402 |
| 5,805,298 | A | * | 9/1998 | Ho et al. | 358/402 |
| 5,805,810 | A | * | 9/1998 | Maxwell | 709/206 |
| 5,812,278 | A | * | 9/1998 | Toyoda et al. | 358/402 |
| 5,826,034 | A | * | 10/1998 | Albal | 709/239 |
| 5,859,967 | A | * | 1/1999 | Kaufeld et al. | 713/200 |
| 5,862,202 | A | * | 1/1999 | Bashoura et al. | 379/100.14 |
| 5,872,901 | A | * | 2/1999 | Konno et al. | 358/1.15 |
| 5,881,233 | A | * | 3/1999 | Toyoda et al. | 709/233 |
| 5,894,558 | A | * | 4/1999 | Falker | 709/239 |
| 5,905,777 | A | * | 5/1999 | Foladare et al. | 379/90.01 |
| 5,920,404 | A | * | 7/1999 | Weiser | 358/434 |
| 5,956,521 | A | * | 9/1999 | Wang | 710/35 |
| 5,974,449 | A | * | 10/1999 | Chang et al. | 709/206 |
| 5,995,240 | A | * | 11/1999 | Sato | 358/407 |
| 6,020,980 | A | * | 2/2000 | Freeman | 358/402 |
| 6,028,679 | A | * | 2/2000 | Murphy | 358/407 |
| 6,088,125 | A | * | 7/2000 | Okada et al. | 358/405 |
| 6,141,695 | A | * | 10/2000 | Sekiguchi et al. | 709/246 |
| 6,157,706 | A | * | 12/2000 | Rachelson | 379/100.08 |
| 6,208,426 | B1 | * | 3/2001 | Saito et al. | 358/1.15 |
| 6,211,972 | B1 | * | 4/2001 | Okutomi et al. | 358/402 |
| 6,266,160 | B1 | * | 7/2001 | Saito et al. | 358/407 |
| 6,581,092 | B1 | * | 6/2003 | Motoyama et al. | 709/219 |

OTHER PUBLICATIONS

English Language Abstract of HEI 5-304538.*
English Language Abstract of HEI 5-103127.*
English Language Abstarct of HEI 6-217069.*
English Lnaguage Abstract of HEI 6-319006.*
An article entitled "The Multimedia Fax–MIME Gateway", Patel et al., IEEE Journal, Winter 1994, pp. 64–70.
English Language Abstract of HEI 9-116728.
Douglas E. Comer, "Internetworking with TCP/IP vol. 1: Principles, Protocols, and Architecture", Third Edition, 1995.
English Language Abstract of HEI 8-314829.
English Language Abstract of HEI 3-222251.*
Englsih Language Abstract of HEI 5-304538.*
Englsih Language Abstract of HEI 5-103127.*
Englsih Language Abstract of HEI 6-217069.*
Englsih Language Abstract of HEI 6-319006.*

* cited by examiner

| TYPE | MAIL ADDRESS |
|---|---|
| FOR PUBLIC USE | ifax01 @ ifax01 |
| FOR RELAY | ifaxrelay01 # 9999 − 9999 @ ifax01 |

FIG. 5 ifax01 @ ifax01
PASSWORD   HOST NAME
NAME

(a)

ifaxrelay01 # 9999 − 9999 @ ifax01
PASSWORD NAME   DESTINATION   HOST NAME
              TELEPHONE NO.

| NUMBER | DOMAIN NAME |
|---|---|
| 1 | abc.co.jp |
| 2 | def.co.jp |
| ⋮ | ⋮ |

COMMUNICATION APPARATUS WITH RELAY FUNCTION AND RELAY METHOD

CROSS REFERENCE TO RELATED APPLICATION

This application is a continuation of U.S. patent application Ser. No. 09/088,712, filed Jun. 2, 1998, now U.S. Pat. No. 6,330,070 the contents of which are expressly incorporated by reference herein in its entirety.

BACKGROUND OF THE INVENTION

1. Field of the Invention

The present invention relates to relay apparatuses that can be installed in Internet facsimile equipment which transmits/receives image information using E-mail over the Internet, and their relay method.

2. Description of the Related Art

Facsimile apparatuses which transmit image information over the Internet using the same operations as in general facsimile equipment have been developed. Since these apparatuses use the Internet for the entire or part of their communication path, this type of facsimile apparatus is called "Internet facsimile".

By placing the Internet facsimile at two Internet ends and using the relay function of the Internet facsimile, it is possible to achieve cost reduction taking advantage of the Internet independent of differences in distance. For example, E-mail data is sent to the nearest Internet facsimile of the G3FAX as the destination via the Internet and from the Internet facsimile it is transmitted to the destination G3FAX via a public line.

When using the Internet facsimile as such a relay apparatus, the owner of the relay apparatus pays the communication expenses up to the destination facsimile. Therefore, it is necessary to prevent the use of the Internet facsimile relay function without permission.

Unexamined Japanese Patent Publication No. 9-116728 is disclosed that the password corresponding to a relay apparatus will be searched from the relay apparatus list and encrypted and then E-mail with the encrypted password added will be sent, and the encrypted password added to the received E-mail is decrypted and if it matches the password that the owner registered beforehand, the relay will be permitted.

However, the above relay system requires all apparatuses using a relay apparatus to be equipped with a mechanism to search the password of the relay apparatus and a mechanism to encrypt the searched password. As apparatuses without the password search mechanism and encryption mechanism cannot use the relay apparatus, such a system has a demerit that this system is available to only a limited number of users.

SUMMARY OF THE INVENTION

The present invention has been implemented taking account of such circumstances. The objective of the present invention is to eliminate the necessity of providing special mechanisms for apparatuses on the transmitting side to prevent abuses of the relay apparatus by unauthorized users and provide a communication apparatus with a relay function and a relay method that allow only authorized users to use the relay apparatus by only inputting a secret relay mail address in the apparatus on the transmitting side.

The present invention provides a communication apparatus with a relay function comprising a recognition section that recognizes mail addresses from the received E-mail data, memory that stores two kinds of mail addresses for public use and relay use and control section that executes the relay processing only when said recognized mail address is a relay mail address.

According to the present invention, relay mail addresses are kept in secret to anybody other than the users who are authorized to use the communication apparatus as a relay apparatus, and thus even if a public mail address is disclosed as was previously, it can prevent unauthorized users from abusing them.

Furthermore, the password name is deleted from the mail address during the relay processing, and even when the header information including the mail address is added to the facsimile data and sent to the destination machine, it is possible to prevent the password from being displayed in a form of header information at the destination terminal.

The Internet facsimile converts received E-mail data to data in a format that renders it receivable by the facsimile apparatus and transmits it to the destination terminal according to a facsimile transmission procedure. Incorporating said communication apparatus on this Internet facsimile allows said communication apparatus with a relay function to be used as an Internet facsimile relay apparatus, converting E-mail to facsimile data and transmitting it to the facsimile apparatus via a telephone line.

DETAILED DESCRIPTION OF THE PREFERRED EMBODIMENTS

With reference now to the attached drawings, the embodiment of the present invention is explained in detail below:

As an operation example of the relay apparatus contained in the Internet facsimile related to the present embodiment, the following describes a case where the transmit data is converted from an E-mail format to a facsimile data format and transferred to the terminal facsimile apparatus.

Figure 1:
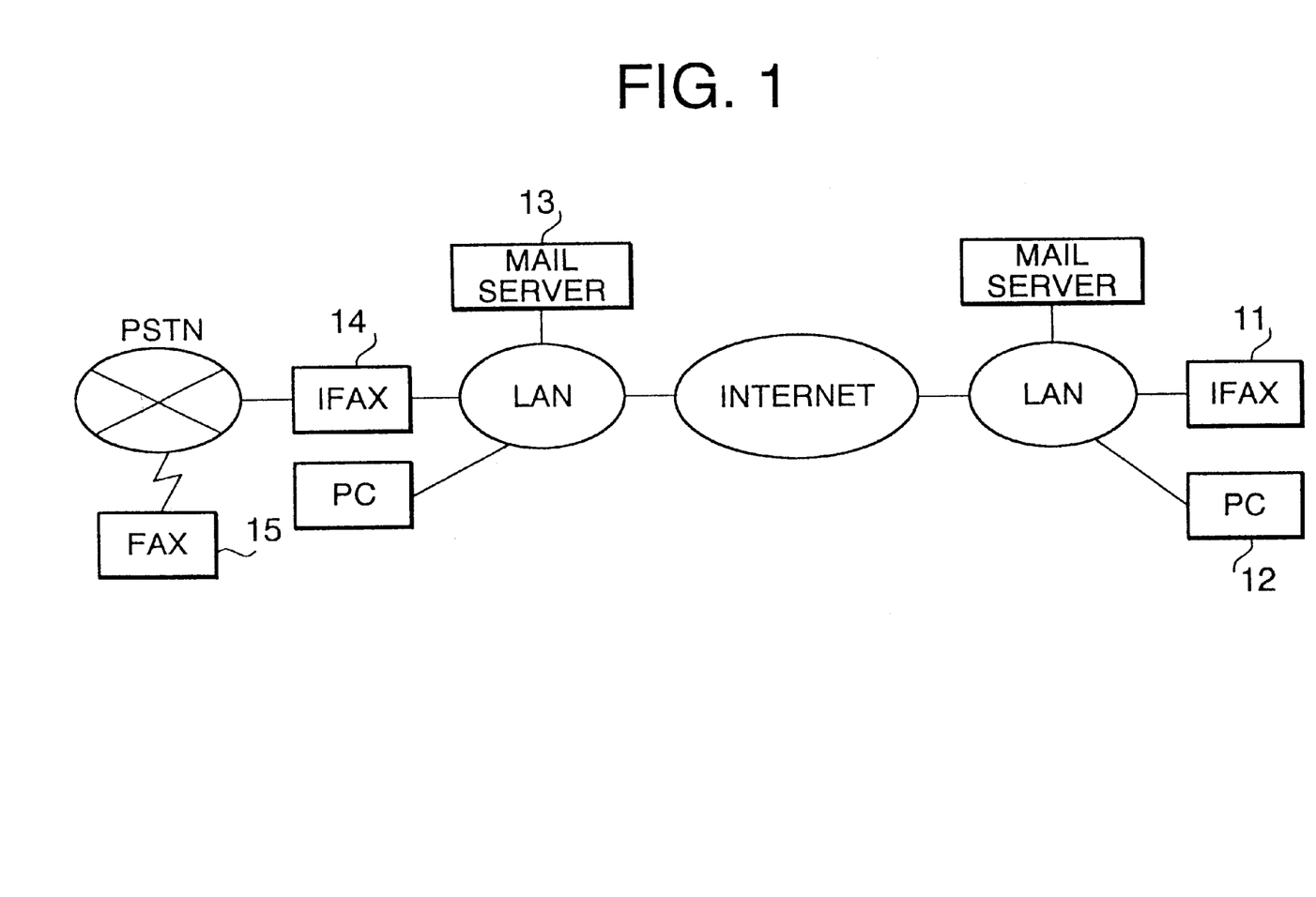
FIG. 1 is a network configuration diagram of the Internet facsimile related to an embodiment of the present invention used as a relay apparatus for data communications.

FIG. 1 shows a network configuration diagram of the relay system using the Internet facsimile in the present embodiment as a relay apparatus. In FIG. 1, Internet facsimile 11 or personal computer 12 functions as a requesting terminal that uses Internet facsimile 14 as a relay apparatus and facsimile 15 functions as a destination terminal that receives data replayed by Internet facsimile 14.

The data sent by E-mail from the requesting terminal (Internet facsimile 11 or personal computer 12) is stored in mail server 13 via the Internet. Internet facsimile 14 converts the E-mail collected from mail server 13 to data in a facsimile data format and transfers it to the destination terminal (facsimile 15) via a telephone line network (PSTN: Public Switched Telephone Network) according to a facsimile procedure.

Figure 2:
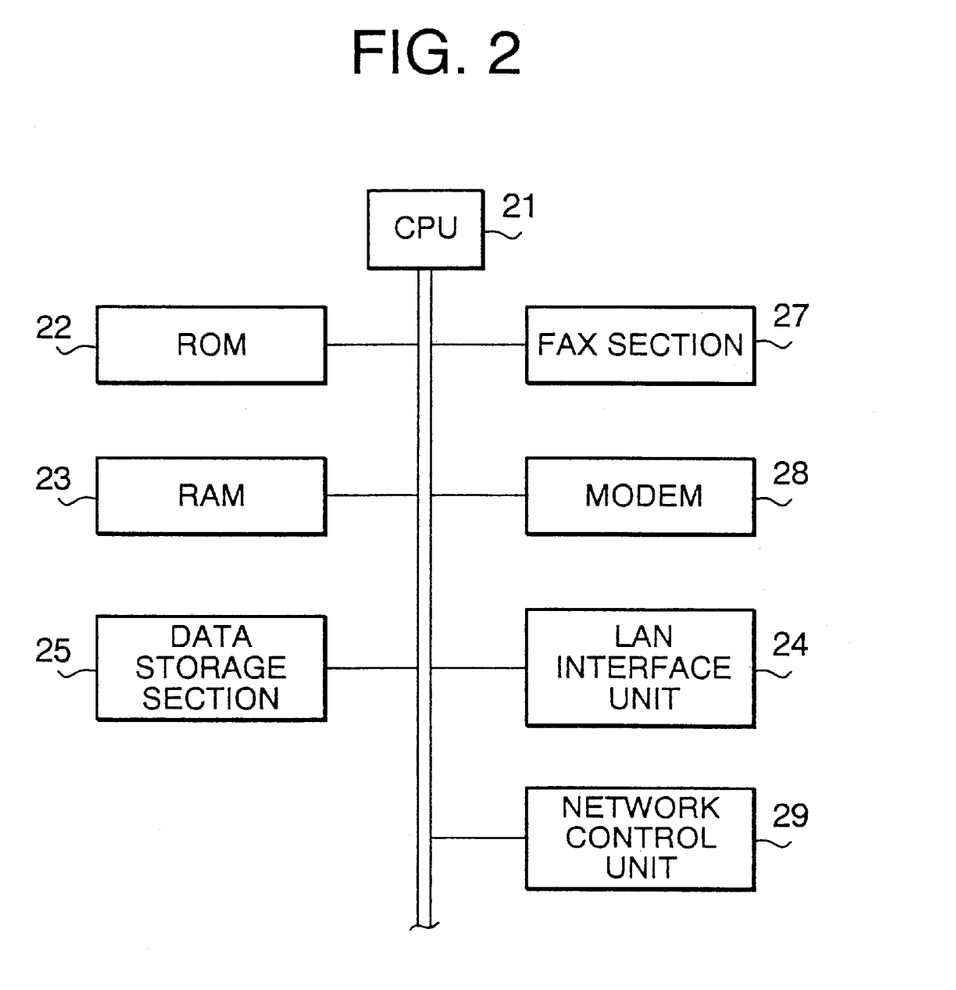
FIG. 2 is a diagram that shows the basic configuration of the Internet facsimile in the embodiment.

FIG. 2 shows a schematic hardware configuration of Internet facsimile 14 provided with a relay function. Internet facsimile 14 comprises CPU 21, ROM 22, RAM 23, LAN interface unit 24, data storage section 25, facsimile section 27, modem 28, network control unit 29, and a scanner and printer, etc. which are not shown in the figure.

CPU 21 executes various functions which will be described later, operating according to a program stored in ROM 22. RAM 23 stores data such as mail addresses and domain names required when it functions as a relay apparatus. LAN interface unit 24 executes the necessary procedure for transmitting/receiving E-mail to/from the network, and data storage section 25 is the memory that stores the received data temporarily. Facsimile section 27 transmits the data converted for facsimile and receives facsimile data and stores it in data storage section 25. Modem 28 modulates/demodulates data transmitted/received to/from the telephone line, and network control unit 29 controls the telephone line.

Figure 3:
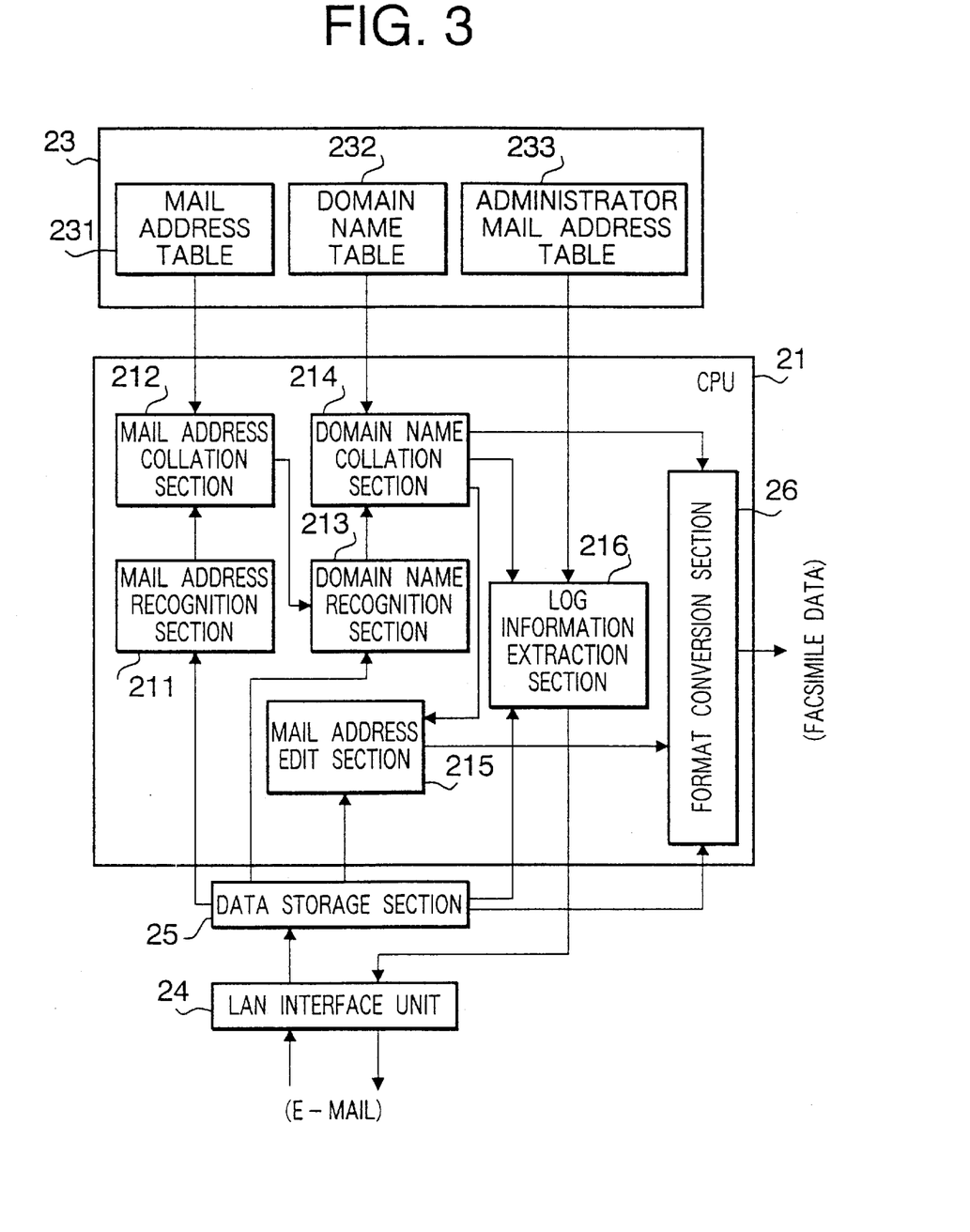
FIG. 3 is a functional diagram of the Internet facsimile in the embodiment.

FIG. 3 shows a functional section of the relay apparatus incorporated in Internet facsimile 14. CPU 21 provides various functions which will be described later by executing the relay program stored in ROM 22.

Mail address recognition section 211 recognizes a mail address from the E-mail data stored in data storage section 25 via LAN interface unit 24. Mail address collation section 212 collates the mail address recognized by mail address recognition section 211 with the relay mail address registered in mail address table 231 in RAM 23. If mail address collation section 212 proves that the mail address is a relay mail address, domain name recognition section 213 recognizes the domain name of the requesting node from the data stored in data storage section 25. Domain name collation section 214 collates the domain name of the requesting node recognized by domain name recognition section 213 with the domain name whose relay stored in domain name table 232 in RAM 23 is permitted. When a relay permission signal is received from domain name collation section 214, mail address edit section 215 extracts specific header information from the E-mail data stored in data storage section 25 and transmits it to format conversion section 26. In the case of the present embodiment, the specific header information contains relay mail addresses without password names. When a relay permission signal is received from domain name collation section 214, log information extraction section 216 extracts log information from the E-mail data stored in data storage section 25 and sends the log information to the administrator mail address destination registered in administrator mail address table 233 in RAM 23. In the case of the present embodiment, the log information contains relay mail addresses and domain names of the requesting node.

Figure 4:
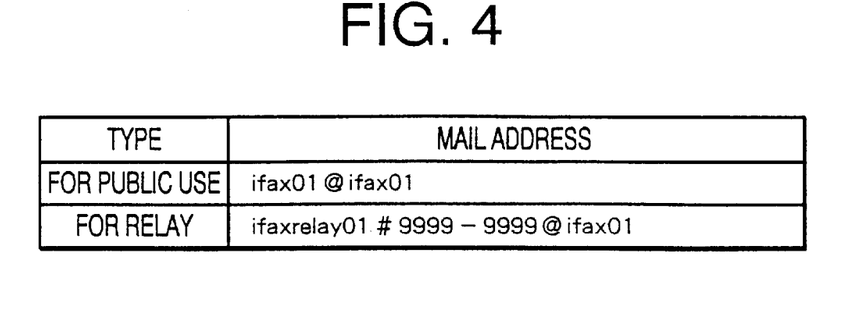
FIG. 4 is a configuration diagram of the mail address table in the embodiment.

The memory space of RAM 23 includes mail address table 231, domain name table 232 and administrator mail address table 233. As shown in FIG. 4, mail address table 231 registers two kinds of mail addresses, public mail address and relay mail address. A relay is permitted when the mail address of the received E-mail data matches the relay mail address registered in mail address table 231.

Figure 5:
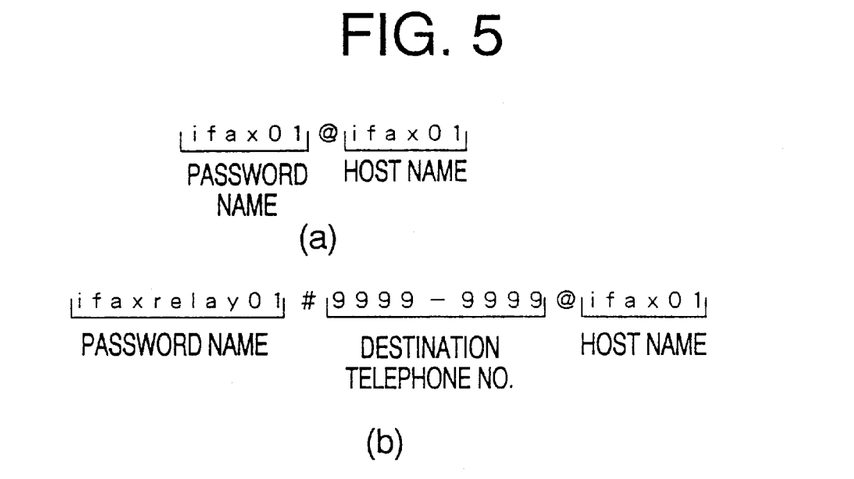
FIG. 5 is a configuration diagram of the mail address in the embodiment.

As shown in FIG. 5A, a public mail address is made up of a password name from the start to @ (at mark) and a host name following @. As shown in FIG. 5B, a relay mail address is made up of a password name from the start to # (sharp), a destination telephone number from # (sharp) to @ (at mark) and a host name following @.

Thus, using the password name of the relay mail address different from the password name of the public mail address and making the relay mail address secret can prevent the relay mail address from being abused even if the public mail address is disclosed.

Figure 6:
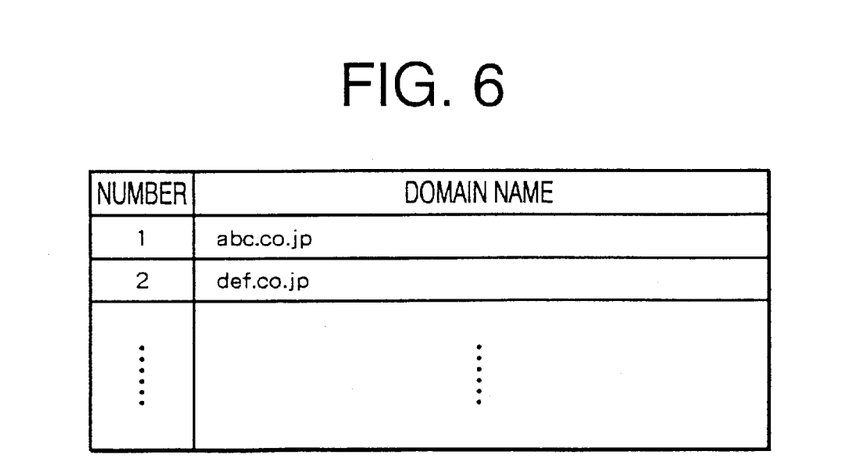
FIG. 6 is a configuration diagram of the domain name table in the embodiment.

FIG. 6 shows the configuration of domain name table 233. As shown in FIG. 6, domain name table 233 in RAM 203 contains domain names for which the relay processing is permitted. The relay processing is permitted as long as the same domain name of a requesting node in the received data is found in the registered domain names. This control allows the security of the Internet facsimile used as the relay apparatus to be maintained.

Figure 7:
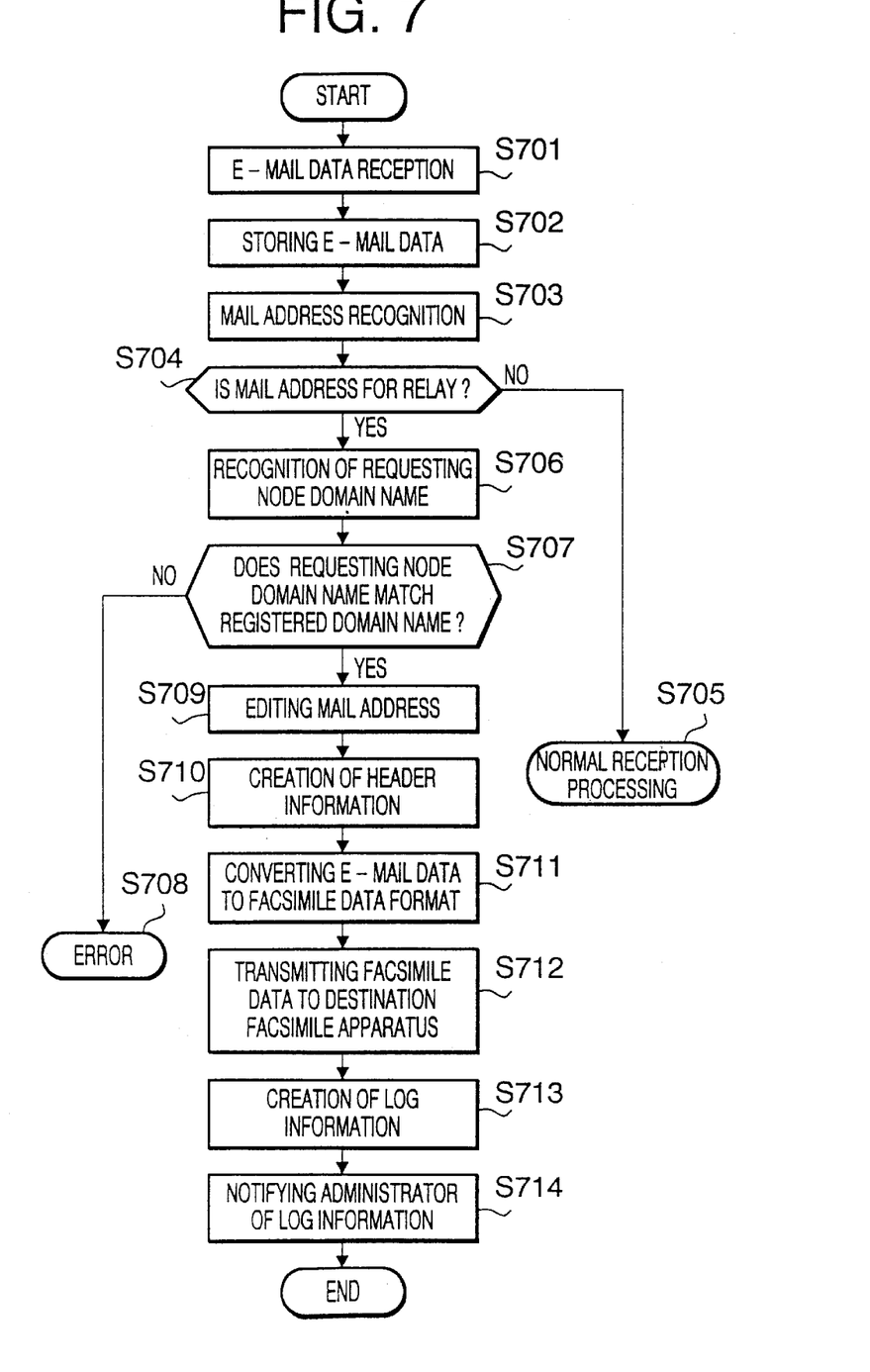
FIG. 7 is a flowchart showing the relay procedure in the embodiment.

Then, the relay operation of the relay system containing the Internet facsimile configured as shown above is explained using FIG. 7. FIG. 7 shows the relay procedure when Internet facsimile 14 is used as the relay apparatus.

Here, two kinds of mail addresses (one for public and the other for relay), domain names for which the relay processing is permitted and mail address of the administrator are registered in each table in RAM 23 beforehand.

When the relay request source, Internet facsimile 11 or personal computer 12, transmits E-mail whose relay mail address has been registered, the E-mail is stored in a mailbox of mail server 13 via the Internet.

Internet facsimile 14 collects the E-mail from mail server 13 installed on the LAN via LAN interface unit 28 (S701). The received E-mail data collected from the network is stored in data storage section 25 in the same E-mail format (S702).

Then, mail address recognition section 211 recognizes the destination mail address from the received E-mail data stored in data storage section 25 (S703). The recognized mail address is handed over to mail address collation section 212. Mail address collation section 212 judges whether the mail address of the received E-mail is a public mail address or relay mail address (S704). Mail address collation section 212 performs this judgment by comparing the password name at the mail address registered in mail address table 231 and the password name registered at the mail address of the received E-mail. If the password name is a public mail address, normal reception processing is performed (S705). That is since it is data that needs not be relayed to other apparatuses, it is printed out by a printer.

If the mail address is a relay mail address, domain name recognition section 213 recognizes the domain name of the requesting node from the received E-mail stored in data storage section 25 (S706). The recognized domain name is handed over to domain name collation section 214. Domain name collation section 214 checks whether the domain name handed over from domain name recognition section 213 is found in the domain names registered in domain name table 232 (S707).

Since only domain names of terminals for which the relay is permitted are registered in domain name table 232, the data from the requesting node with the domain name that does not match the domain name registered in domain name table 232 is not relayed, resulting in an error (S708). This prevents the Internet facsimile from being abused as the relay apparatus without permission even in the case that the relay mail address is disclosed to users unauthorized to perform the relay processing. Furthermore, for reasons specific to relaying Internet facsimile 14, if the number of domains available or domain name is to be restricted, arrangements can easily be made by only changing the domain name registered in domain name table 2322.

On the other hand, if the same domain name of the requesting node has been registered in domain name table 232, the subsequent processing is taken over by mail address edit section 215. Mail address edit section 215 deletes the password name from the mail address the received E-mail data stored in data storage section 25 (S709). Header information containing the mail address whose password name has been deleted is created (S710). This header information is handed over to format conversion section 26.

Then, format conversion section 26 collects the received E-mail data from data storage section 25 and replaces the mail header with the header information created by mail address edit section 215 and executes format conversion (S711). Through format conversion, the received E-mail data is converted from an E-mail format to a facsimile data format. Even if the header information is output from the destination terminal (facsimile apparatus), this prevents the password name of the relay mail address from being displayed, making it possible to maintain the confidentiality of the relay mail address.

This facsimile data is buffered in transmission memory. Furthermore, the telephone number of the relay destination terminal (facsimile apparatus) inserted at the mail address of the received E-mail is stored in a prescribed area in RAM 23.

When facsimile section 27 receives the relay permission signal from CPU 21, it dials up the telephone number stored in the prescribed area in RAM 23, connects the line with the relay destination terminal by controlling modem 28 and network control unit 29 and transmits the facsimile data to the connected terminal via a telephone line network (PSTN) (S712).

Simultaneously with the creation of the header information, log information consisting of a mail address, requesting node domain name, etc. is created (S713) and said log information is E-mailed to the mail address of the administrator (S714).

This helps the Internet facsimile administrator control the situation, for example, investigate the frequency of use, improving the level of administrative convenience. It also allows the administrator to monitor the use of the apparatus as the relay apparatus every time the relay processing is performed and immediately discover any abuse or abnormal use of the apparatus by checking the transmission source/destination and quickly take the appropriate action, thus improving the security performance.

Through notification by E-mail each time, describing the transmission source mail address and destination telephone number, etc. according to the subject of the mail makes it possible to know the whole situation of relay processing clearly without opening the mail.

In the network configuration example shown in FIG. 1, the Internet facsimile and mail server are located in the LAN, but it is also possible to configure the system so that the Internet facsimile may have direct dial-up connections with the mail server located on the Internet.

In the explanation above, the relay mail address must always be described in the following format including a private password:

Password#transfer destination telephone number@domain name

On the other hand, the standardized relay mail address is described in the following format including a fixed form statement which indicates that it is a relay mail address. The fixed form portion specified by the IETF (Internet Engineering Task Force) is "FAX=" and since it follows a standardized procedure, everybody can know it.

Fixed form portion=transfer destination telephone number@domain name

When carrying out relay processing by recognizing the standardized relay mail address, the mail is transferred to the telephone number entered between "=" after the fixed form statement and "@". No processing for restricting the users described in the above embodiment is performed.

The Internet facsimile is configured so that each user may select the relay (special relay) that restricts users by recognizing the relay mail addresses containing private passwords or relay (general relay) that does not restrict users by recognizing standardized relay mail addresses. The Internet facsimile is provided with both the function to perform the special relay and the function to perform the general relay described in said embodiment, and either one is enabled according to the user setting. This setting is implemented by adding it to the facsimile general setting items.

This Internet facsimile allows the relay apparatus side to select a desired relay method.

Furthermore, it can also be configured so that the mail address recognition section may recognize the type of the relay mail address and execute a special relay if it is a relay mail address for special relay and a general relay if it is a relay mail address for general relay.

Industrial Applicability

As described above, the facsimile data relay apparatus related to the present invention is effective in relaying E-mail received from the network by the Internet facsimile via a telephone line to a facsimile (G3FAX), which is suitable for enhancement of the mechanism and security on the transmitting side.

What is claimed is:

1. A facsimile apparatus connected to a telephone network and to the Internet, the facsimile apparatus being capable of receiving E-mail data via the Internet and transmitting facsimile data to a facsimile destination via the telephone network, the facsimile apparatus comprising:

a detector that detects, in a mail address of the E-mail data, a password indicating an instruction to relay the received E-mail data to the facsimile destination, and a telephone number of the facsimile destination;

a generator that, when the detector detects the password and the telephone number, deletes the password from the mail address, and generates header information including a mail address after deleting the password;

a converter that converts the E-mail data, including the header information, into facsimile data, and a transmitter that transmits the converted facsimile data with the header information, without the password that instructs relaying, to the facsimile destination indicated by the telephone number.

2. The facsimile apparatus according to claim 1, wherein the mail address includes a host name.

3. The facsimile apparatus according to claim 1, further comprising:

a printer that, when the facsimile number of the facsimile destination is not included in the mail address, prints a facsimile data, the facsimile data being converted from the received E-mail data by the converter.

4. The facsimile apparatus according to claim 1, further comprising:

a recognition section that recognizes a sender domain name contained in the E-mail data, a compartor that compares the recognized sender domain name with a predetermined domain name, the transmitter transmitting the facsimile data when the recognized domain name agrees with the predetermined domain name.

5. The facsimile apparatus according to claim 1, further comprising:

a transmitter that transmits log information including the telephone number of the facsimile destination and information regarding the sender of the relayed E-mail to a mail address of a manager of a receiving node.

6. The facsimile apparatus according to claim 1, further comprising:

a scanner that scans document data and converts the document data into image data; an input section that inputs an E-mail address to which the image data is to be transmitted; a converter that converts the image data into E-mail data; and an E-mail transmitter that transmits the E-mail data to the input E-mail address via the Internet.

7. The facsimile apparatus according to claim 1, further comprising a memory that stores relay mail addresses, each relay mail address including the password, the facsimile destination telephone number and a host name.

8. A method for receiving E-mail data via the Internet and relaying facsimile data to a facsimile destination via a telephone network, the method comprising:

detecting, in a mail address of the E-mail data, a password indicating an instruction to relay the received E-mail data to the facsimile destination, and a telephone number of the facsimile destination;

deleting, when the detector detects the password and the telephone number, the password from the mail address, and generating header information including a mail address after deleting the password;

converting the E-mail data, including the header information, into facsimile data, and transmitting the converted facsimile data, with the header information and without the password that instructs relaying, to the facsimile destination indicated by the telephone number.

9. The method according to claim 8, wherein the mail address includes a host name.

10. The method according to claim 8, further comprising:

printing, when the telephone number of the facsimile destination is not included in the mail address, the facsimile data, the facsimile data being converted from the received E-mail data.

11. The method according to claim 8, further comprising;

recognizing a sender domain name contained in the E-mail data;

comparing the recognized sender domain name with a predetermined domain name, transmitting the facsimile data when the recognized domain name agrees with the predetermined domain name.

12. The method according to claim 8, further comprising;

transmitting log information including the telephone number of the facsimile destination and information regarding the sender of the relayed E-mail to a mail address of a manager of a receiving node.

13. The method according to claim 8, further comprising;

scanning document data and converting the document data into image data;

inputting an E-mail address to which the image data is to be transmitted;

converting the image data into E-mail data; and transmitting the E-mail data to the input E-mail address.

14. A facsimile apparatus connected to a telephone network and to the Internet, the facsimile apparatus being capable of receiving E-mail data via the Internet and transmitting facsimile data to a facsimile destination via the telephone network, the facsimile apparatus comprising:

a detector that detects a password indicating an instruction to relay the received E-mail data to the facsimile destination, and a telephone number of the facsimile destination;

a generator that, when the detector detects the password and the telephone number, deletes the password, and generates header information including a mail address after deleting the password;

a converter that converts the E-mail data, including the header information, into facsimile data;

a transmitter that transmits the converted facsimile data with the header information, without the password that instructs relaying, to the facsimile destination indicated by the telephone number; and a printer that, when the detector does not detect the password, prints a facsimile data without transmitting the facsimile data to another destination, the facsimile data being converted from the received E-mail data by the converter.

15. A method for receiving E-mail data via the Internet and relaying facsimile data to a facsimile destination via a telephone network, the method comprising:

detecting a password indicating an instruction to relay the received E-mail data to the facsimile destination, and a telephone number of the facsimile destination;

deleting, when the detector detects the password and the telephone number, the password, and generating header information including a mail address after deleting the password;

converting the E-mail data, including the header information, into facsimile data;

transmitting the converted facsimile data with the header information and without the password to instruct relaying to the facsimile destination indicated by the telephone number; and printing, when the detector does not detect the password, a facsimile data without transmitting the facsimile data to another destination, the facsimile data being converted from the received E-mail data.

* * * * *